(12) United States Patent
Liao

(10) Patent No.: US 7,182,350 B1
(45) Date of Patent: Feb. 27, 2007

(54) CART WITH AUXILIARY WHEELS

(76) Inventor: Hui-Chen Liao, No. 14, Lane 155, Sec. 3, Hsi-Tun Rd., Taichung (TW)

( * ) Notice: Subject to any disclaimer, the term of this patent is extended or adjusted under 35 U.S.C. 154(b) by 0 days.

(21) Appl. No.: 11/265,947

(22) Filed: Nov. 2, 2005

(51) Int. Cl.
*B62B 3/00* (2006.01)

(52) U.S. Cl. .............................. 280/47.34; 280/33.991; 280/651; 280/33.998; 280/79.11

(58) Field of Classification Search ............. 280/79.11, 280/33.991, 651, 33.998, 47.34
See application file for complete search history.

(56) References Cited

U.S. PATENT DOCUMENTS

| 2,688,493 | A | * | 9/1954 | Rosenberg | .................. | 280/651 |
| 2,879,072 | A | * | 3/1959 | Rear et al. | ..................... | 280/40 |
| 5,050,898 | A | * | 9/1991 | Petrell, Jr. | ............... | 280/79.11 |
| 5,556,118 | A | * | 9/1996 | Kern et al. | .............. | 280/47.16 |
| 6,203,029 | B1 | * | 3/2001 | Ondrasik | ............... | 280/33.991 |
| 6,331,009 | B1 | * | 12/2001 | Wilkinson | ............. | 280/33.996 |
| 6,983,946 | B2 | * | 1/2006 | Sullivan et al. | .......... | 280/79.11 |
| 7,014,200 | B2 | * | 3/2006 | Calmeise et al. | ........ | 280/47.35 |

* cited by examiner

*Primary Examiner*—Christopher P. Ellis
*Assistant Examiner*—Cynthia F. Collado
(74) *Attorney, Agent, or Firm*—Alan D. Kamrath; Nikolai & Mersereau, P.A.

(57) ABSTRACT

A cart with auxiliary wheels has a body having a bottom and two ends, a handle, at least one front swiveling wheel, a set of rear swiveling wheels and a set of auxiliary wheels. The handle is formed on the body. The front swiveling wheels and the rear swiveling wheels are mounted rotatably and respectively on the bottom of the body. The swiveling wheels are omni-directional and allow the cart to be moved in all directions. The auxiliary wheels are mounted centrally between the front swiveling wheels and the rear swiveling wheels. The auxiliary wheels are non-swiveling and are mounted parallel with the front-rear direction of the cart to provide straight-line stability to the cart.

3 Claims, 7 Drawing Sheets

CART WITH AUXILIARY WHEELS

BACKGROUND OF THE INVENTION

1. Field of the Invention

The present invention relates to a cart and, more particularly, to a cart having auxiliary wheels.

2. Description of the Related Art

Carts are commonly used to transport articles, goods and the like from one location to another. With reference to FIGS. 6 and 7, a conventional cart (70) in accordance with the prior art comprises a platform (71), an upright handle (72), a pair of front swiveling wheels (81) and a pair of rear swiveling wheels (82).

The platform (71) is substantially rectangular-shaped for carrying goods and has a bottom having two ends, a front end having two sides and a rear end having two sides.

The upright handle (72) is formed and protrudes upward from an end of the platform (71).

The front swiveling wheels (81) are mounted respectively and rotatably at each side on the bottom of the front end of the platform (71).

The rear swiveling wheels (82) are mounted respectively and rotatably at each side on the bottom of the rear end of the platform (71).

The swiveling wheels (81), (82) are omni-directional and allow the cart (70) to be moved in all directions.

However, there are some disadvantages in the conventional cart (70).

1. The swiveling wheels (81), (82) allow the cart (70) to be moved in all directions effortlessly, however, if the cart (70) is moved or turned at high speed, it becomes difficult to steer and tends to swing unstably.

2. The swiveling wheels (81), (82) are not strong enough to bear heavy loads and are easily deformed or damaged.

To overcome the shortcomings, the present invention provides a cart with auxiliary wheels to obviate or mitigate the aforementioned problems.

SUMMARY OF THE INVENTION

The main objective of the invention is to provide a cart with auxiliary wheels that can effectively restrain the swing of the cart while moving and further provide straight-line stability to the cart.

A further objective of the invention is to provide a cart with auxiliary wheels that more uniformly distributes the loading on the wheels.

Another further objective of the invention is to provide a cart with auxiliary wheels that has enhanced maneuverability over uneven surfaces.

To accomplish the foregoing objective, the cart in accordance with the present invention comprises a body, a handle, at least one front swiveling wheel, a set of rear swiveling wheels and a set of auxiliary wheels.

The body has a bottom having two sides, a front end having two sides and a rear end having two sides.

The handle is formed on the body.

The front swiveling wheel is mounted rotatably on the bottom of a middle portion of the front end of the body.

The set of rear swiveling wheels is mounted rotatably and respectively at each side of the bottom of the rear end of the body.

The swiveling wheels are omni-directional and allow the cart to be moved in all directions.

The set of auxiliary wheels are mounted respectively at two side of the bottom of the body at a central point between the front swiveling wheel and the set of rear swiveling wheels.

The auxiliary wheels are non-swiveling and are mounted parallel with the front-rear direction of the cart to provide straight-line stability.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
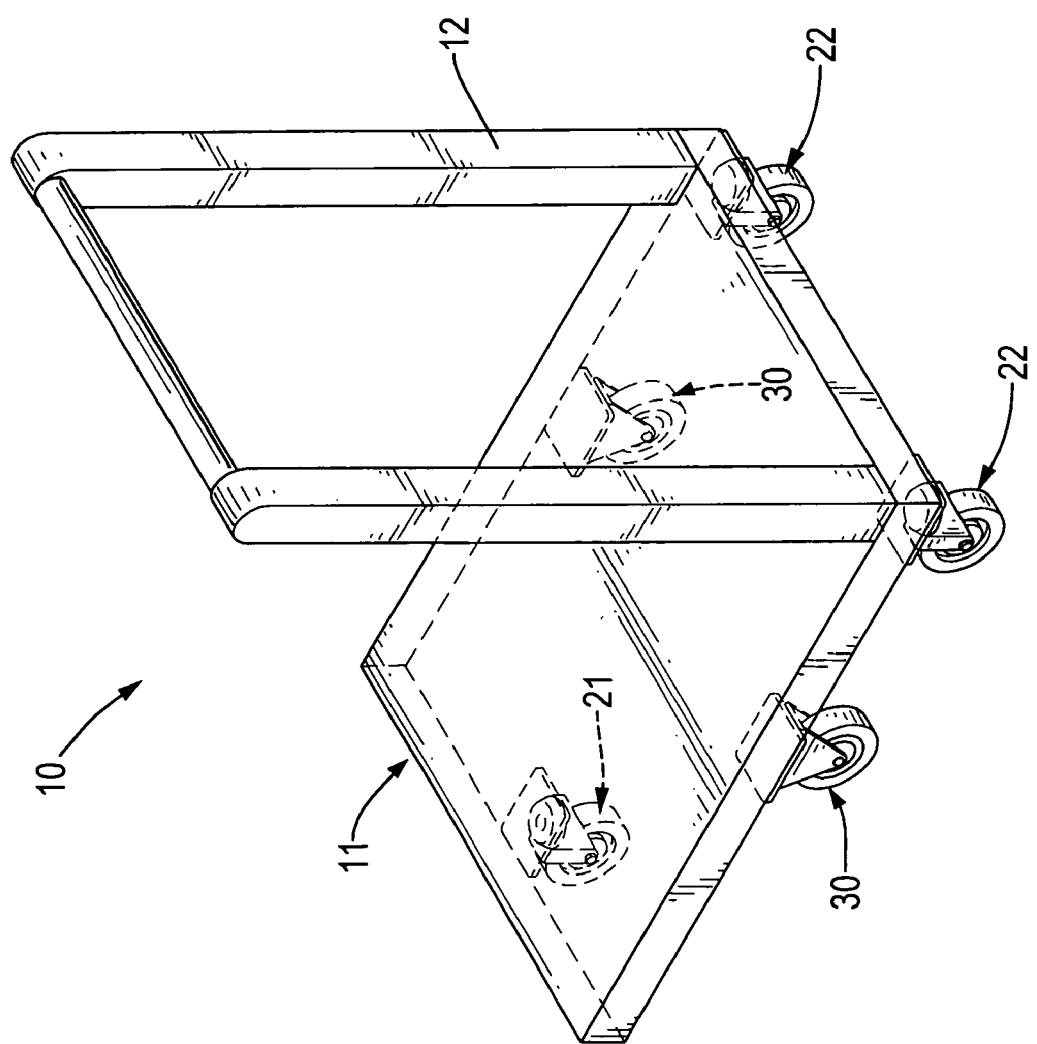
FIG. 1 is a perspective view of a first embodiment of a cart in accordance with the present invention.
Figure 2:
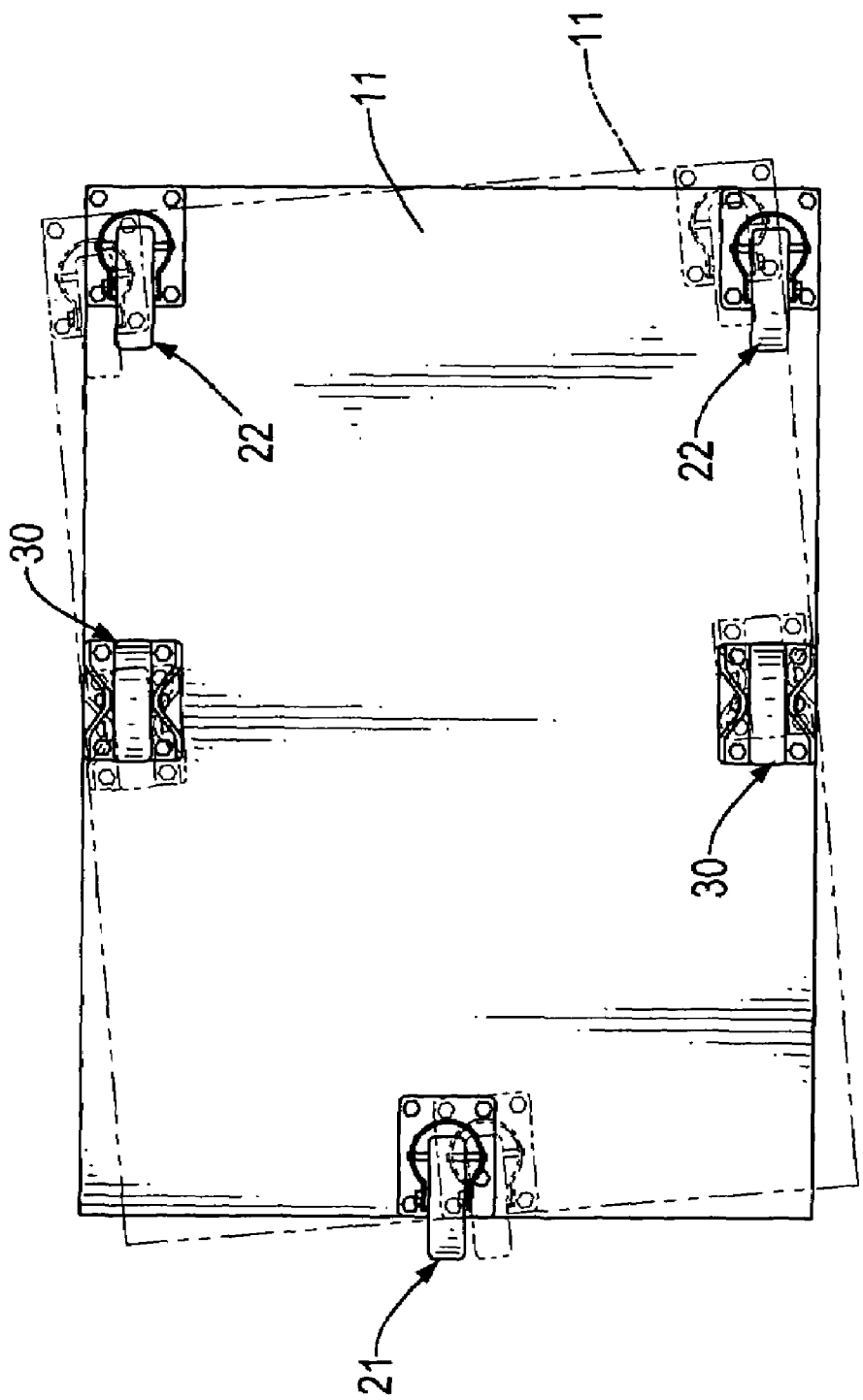
FIG. 2 is a bottom view of the cart in FIG. 1.
Figure 3:
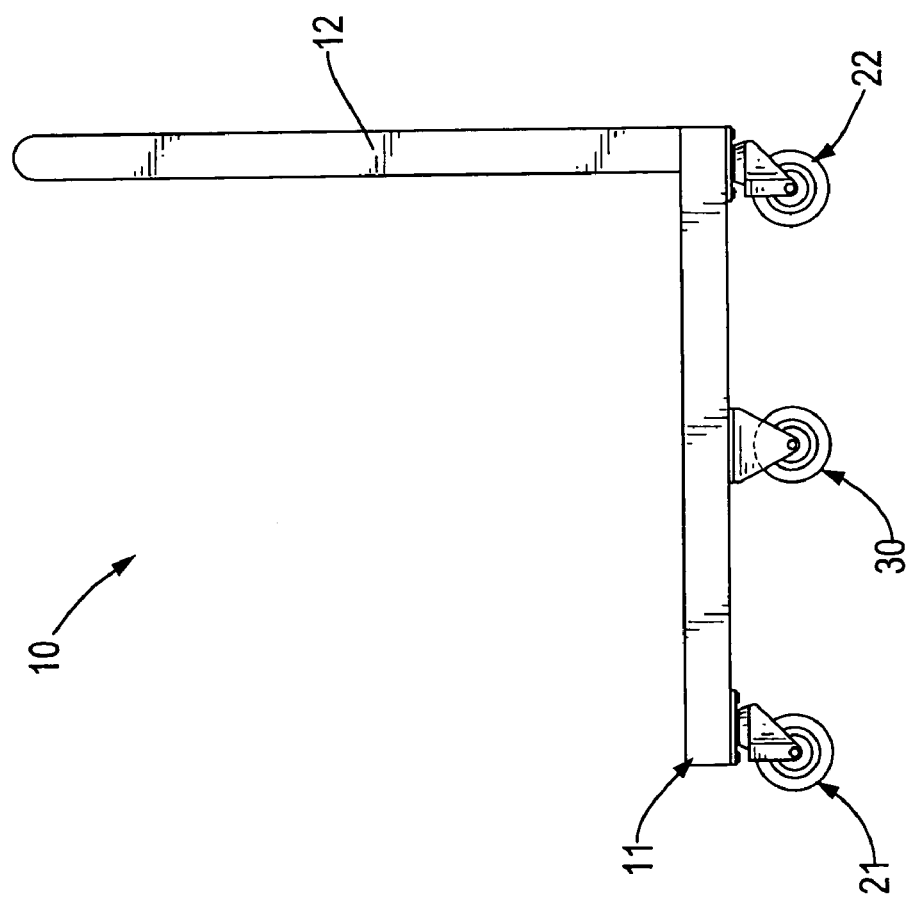
FIG. 3 is a side view of the cart in FIG. 1.

With reference to FIGS. 1–3, a first embodiment of a cart (10) in accordance with the present invention comprises a body, an upright handle (12), a front swiveling wheel (21), a pair of rear swiveling wheels (22) and a pair of auxiliary wheels (30).

The body is a platform (11), is substantially rectangular-shaped and has a bottom having two sides, a front end having two sides and a rear end having two sides.

The upright handle (12) is formed and protrudes upward from the rear end of the platform (11).

The front swiveling wheel (21) is mounted rotatably and centrally on the bottom of the front end and the rear swiveling wheels (22) are mounted rotatably and respectively at two sides of the bottom of the rear end. The swiveling wheels (21), (22) are omni-directional and allow the cart (10) to be moved in all directions.

The auxiliary wheels (30) are mounted respectively at two sides of the bottom at a central point between the front swiveling wheel (21) and the set of rear swiveling wheels (22). The auxiliary wheels (30) are non-swiveling and are mounted parallel with the front-rear direction of the cart (10) to provide straight-line stability to the cart (10).

Figure 4:
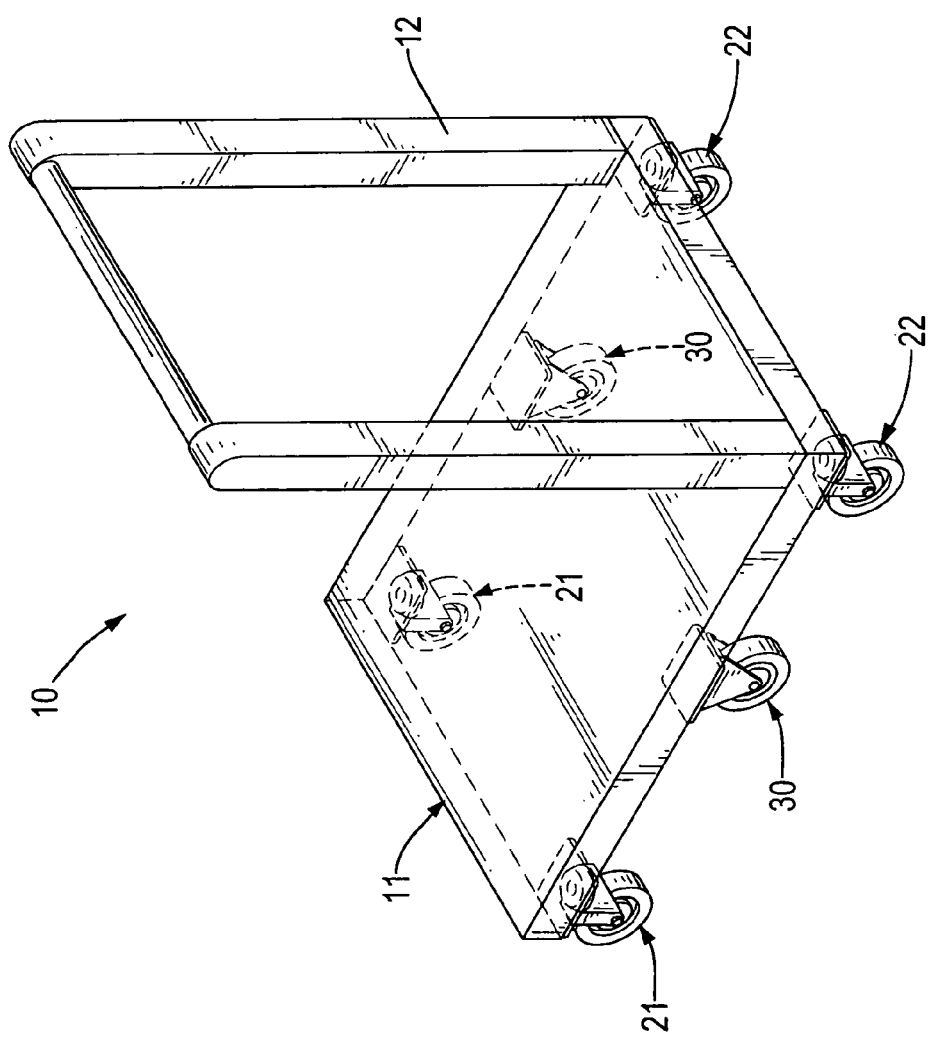
FIG. 4 is a perspective view of a second embodiment of a cart in accordance with the present invention.

With reference to FIG. 4, a second embodiment of the cart (10) is equipped with two front swiveling wheels (21) mounted rotatably and respectively at two sides on the bottom of the front end of the platform (11).

The cart (10) in accordance with the present invention has the following advantages.

1. The auxiliary wheels (30) help to hold the direction of travel of the cart (10) in a straight-line direction and keep the cart (10) smooth and stable when turning at high speed.

2. The auxiliary wheels (30) mounted between front swiveling wheels (21) and rear swiveling wheels (22) provide an additional load bearing support to prevent deformation and damage to the wheels (21), (22), (30) under heavy loads.

Figure 5:
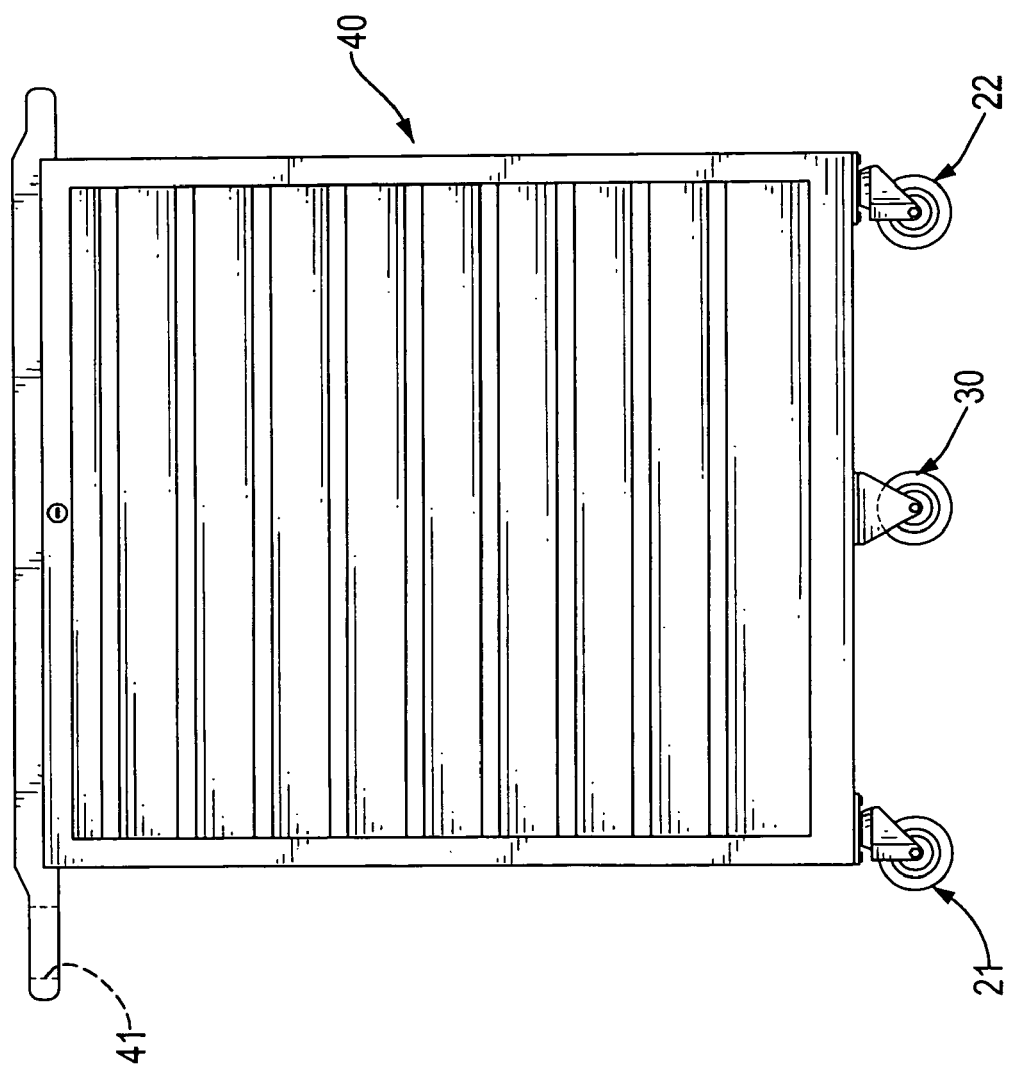
FIG. 5 is a side view of a third embodiment of a cart in accordance with the present invention.
Figure 6:
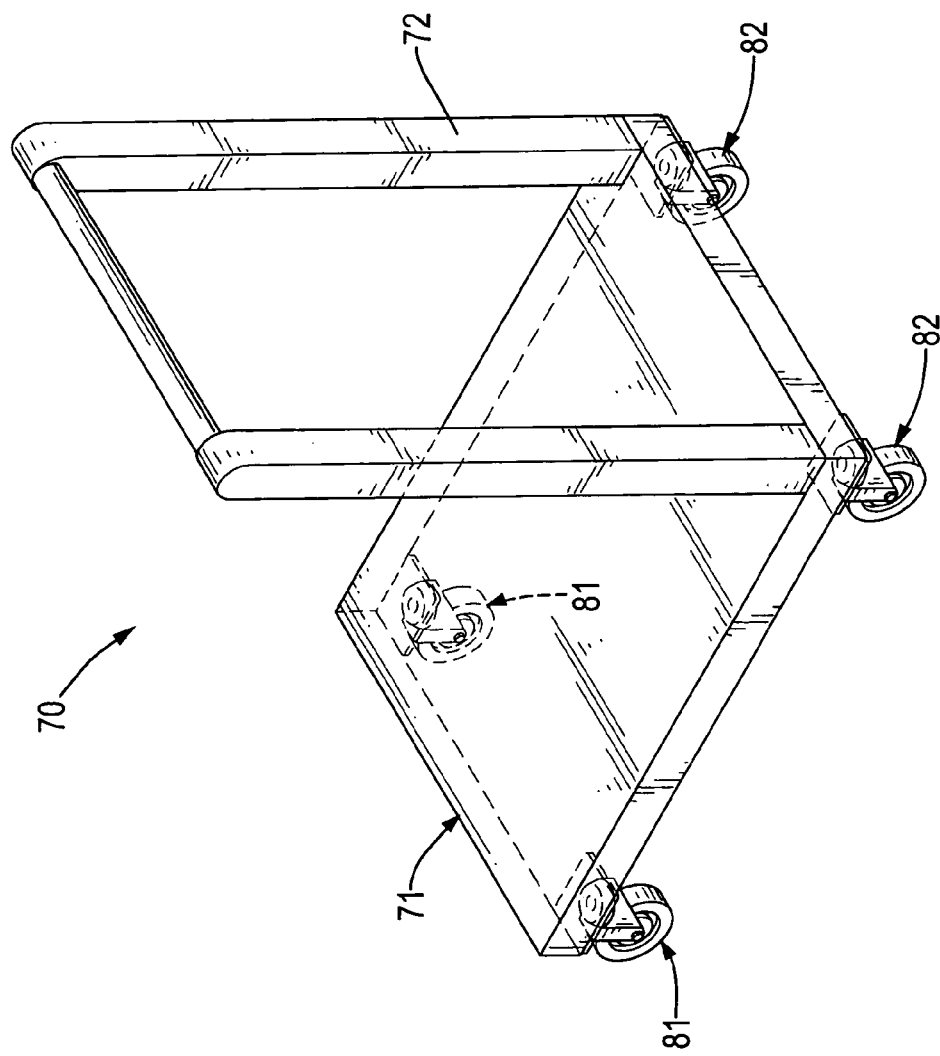
FIG. 6 is a perspective view of a conventional cart.
Figure 7:
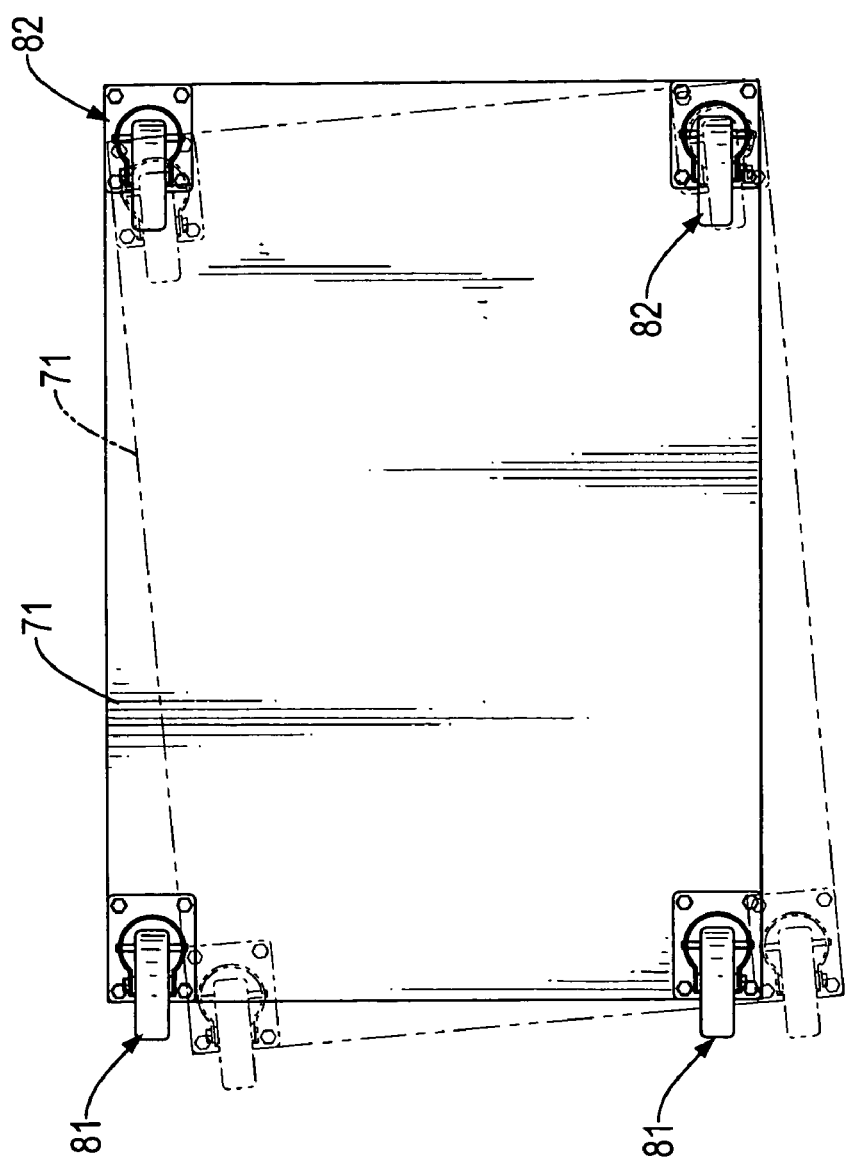
FIG. 7 is a bottom view of the conventional cart in FIG. 6.

With reference to FIG. 5, a third embodiment of this invention is disclosed, wherein the cart (10) has a body, a handle (41), a set of front swiveling wheels (21), a set of rear swiveling wheels (22) and a pair of auxiliary wheels (30).

The body is a tool cabinet (40) and has a top having two ends, a bottom.

The handle (41) is formed and protrudes out from an end of the top.

The auxiliary wheels (30) are mounted centrally between the set of front swiveling wheels (21) and the set of rear swiveling wheels (22).

Even though numerous characteristics and advantages of the present invention have been set forth in the foregoing description together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A cart with auxiliary wheels comprising:
    a body having
        a bottom having two sides;
        a front end having two sides;
        a rear end having two sides; and
        a top having two ends;
    a handle formed on the body;
    at least one front swiveling wheel mounted rotatably on the bottom of the front end of the body;
    a set of rear swiveling wheels being omni-directional, mounted rotatably and respectively at two sides on the bottom of the rear end of the body; and
    a set of auxiliary wheels being non-swiveling, mounted parallel with a front-rear direction of the cart and mounted respectively at two sides of the bottom of the body at a central point between the at least one front swiveling wheel and the set of rear swiveling wheels, wherein the body is a tool cabinet and the handle is formed and protrudes out from an end of the top, wherein the top is parallel to the bottom of the tool cabinet, with the handle secured to the top and protruding out from the end of the top in a direction parallel to the top and the bottom and opposite to the other end of the top.

2. The cart with auxiliary wheels as claimed in claim 1, wherein the at least one front swiveling wheel comprises two front swiveling wheels mounted respectively at the two sides on the bottom of the front end of the body.

3. The cart with auxiliary wheels as claimed in claim 1, wherein the cart is equipped with one front swiveling wheel, which is mounted centrally on the bottom of the front end of the body.

* * * * *